(12) United States Patent
Amundson

(10) Patent No.: US 8,001,496 B2
(45) Date of Patent: Aug. 16, 2011

(54) CONTROL OF DESIGN AUTOMATION PROCESS

(75) Inventor: Michael D. Amundson, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 12/034,701

(22) Filed: Feb. 21, 2008

(65) Prior Publication Data

US 2009/0217184 A1    Aug. 27, 2009

(51) Int. Cl.
*G06F 17/50* (2006.01)
(52) U.S. Cl. ......................................................... 716/100
(58) Field of Classification Search ................ 716/1, 11, 716/100
See application file for complete search history.

(56) References Cited

U.S. PATENT DOCUMENTS

| | | | |
|---|---|---|---|
| 5,581,475 A | 12/1996 | Majors | |
| 7,472,231 B1* | 12/2008 | Cihla et al. ..................... | 711/144 |
| 7,827,016 B1* | 11/2010 | Ho ................................... | 703/13 |
| 2005/0015437 A1* | 1/2005 | Strait ............................ | 709/203 |
| 2005/0049841 A1* | 3/2005 | Chen et al. ...................... | 703/14 |
| 2005/0278670 A1* | 12/2005 | Brooks et al. ..................... | 716/5 |
| 2006/0101368 A1* | 5/2006 | Kesarwani et al. ............. | 716/11 |
| 2006/0117274 A1* | 6/2006 | Tseng et al. ..................... | 716/1 |
| 2008/0249758 A1* | 10/2008 | Gabele et al. ................... | 703/14 |
| 2008/0256135 A1* | 10/2008 | Nelson et al. ............... | 707/104.1 |
| 2009/0031261 A1* | 1/2009 | Smith et al. ....................... | 716/2 |

* cited by examiner

*Primary Examiner* — Jack Chiang
*Assistant Examiner* — Suchin Parihar
(74) *Attorney, Agent, or Firm* — Toler Law Group

(57) ABSTRACT

A system is implemented for controlling long running electronic design automation tools. A user may modify the running of the tool in real time using an interface at the user computer. The user computer accepts user input and communicates with a computer running the design application. The design application runs normally unless a user enters input requiring modification of the process being run by the design application.

20 Claims, 1 Drawing Sheet

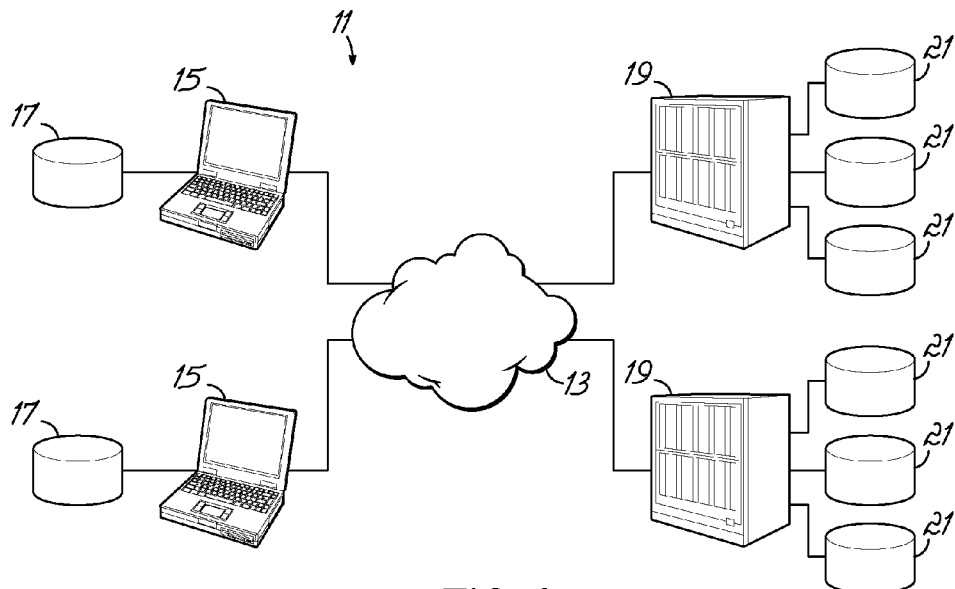
FIG. 1
Interactive, process does not
continue without new user input
Batch, process continues without
respect for new user input
FIG. 2
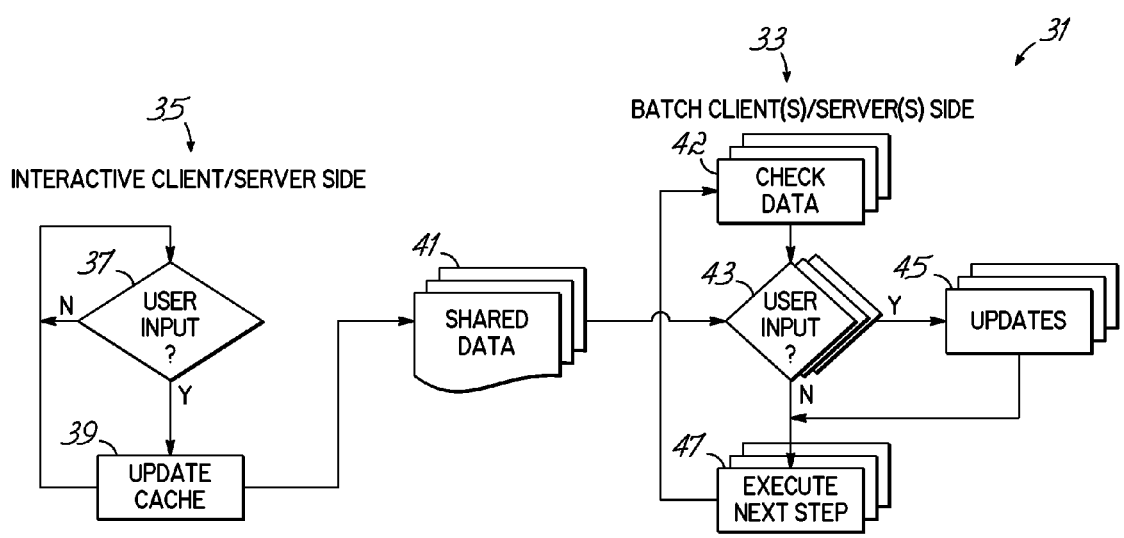
FIG. 3

CONTROL OF DESIGN AUTOMATION PROCESS

FIELD OF THE INVENTION

The present invention relates generally to control of the design automation process. More particularly, a batch run design automation process through Electronic Design Automation tools used in designing electronic circuits is controlled throughout the batch run.

BACKGROUND OF THE INVENTION

Electronic Design Automation (EDA) tools are a category of tools used for designing and producing electronic systems ranging from printed circuit boards (PCBs) to integrated circuits. Before EDA, integrated circuits were designed by hand and manually laid out. Current EDA tools are used in designing digital circuitry, as well as incorporation of analog designs and mixed systems. Further, current digital flows are extremely modular. EDA is divided into many, and sometimes overlapping, sub-areas. They mostly align with the path of manufacturing from design generation to mask generation.

In general, most EDA tools are batch run tools and can require significant runtimes, from several minutes to several days. While advancements in EDA development include attempts to reduce runtime, certain steps perform best when they are run with a large amount of design data. The large volume of design data results in longer than desired runtimes. This may be the case, for example, in placement driven synthesis. Placement driven synthesis is done by tools such as International Business Machines Corporation (IBM)'s PDSrtl tool. Breaking apart the design or steps is not always the best engineering decision because some jobs have long runtimes and unexpected iterations can result in substantially increased costs.

One attempt at reducing costly iterations includes writing relevant design data at particular checkpoints of a long running job. The job can use the checkpoint design data and save time. However, such an approach involves overhead in restarting the job. Further, there may be excess data storage requirements, and the loaded checkpoint must exactly match the in-core data from the initial process. A further problem with such an approach is that a user may wish to control a specific step in the application, but may not with the checkpoint method.

Another approach used by IBM's PDSrtl tool allows the reading of a specific file at predefined intervals. The intervals are similar to the checkpoints previously discussed. However, such reading of specific files is relatively difficult to use. A user must have detailed development knowledge of the placement driven synthesis application. Further, the mechanism is error prone and can significantly harm the design process. For the above reasons, what is needed is a way to control a long running EDA application.

SUMMARY OF THE INVENTION

Embodiments consistent with the present invention provide an Interactive Client/Server to Batch Client/Server approach to control a long running EDA application. In accordance with the system, method and program product, a user may modify a long running EDA application in real time using a simple interface such as a web browser. The terms "Interactive Client/Server" and "Batch Client/Server" refer to machines running different processes as further described herein.

In one embodiment, a method is provided for controlling an EDA tool, such as an automation design program, which generates a model for an electronic circuit design. An interface may be provided for a Batch Client/Server connected to an Interactive Client/Server. The Batch/Client Server runs an automation design program. The running of the automation design program is monitored by the Interactive Client/Server. In an exemplary embodiment, the Batch Client/Server checks for input commands from the Interactive Client/Server and modifies the running of the automation design program in response. In another exemplary embodiment, checking for input commands is conducted at predetermined intervals optionally by both the Interactive Client/Server and at the Batch/Client Server. The automation design program runs normally unless the user enters input into the Interactive Client/Server. The Interactive Client/Server can interface with from one to "n" Batch Client/Servers.

Another embodiment of the invention includes a program product. A first program is configured to run on at least one Batch Client/Server and to interface the Batch Client/Server computer with a second Interactive Client/Server interface program. The second Interactive Client/Server interface program is configured to run on an Interactive Client/Server for allowing a user at the Interactive Client/Server to monitor an automation design program running on the Batch Client/Server. In an exemplary aspect, the first program is configured for receiving instructions from the second interface program and for controlling the running of the automation design program. The second interface program is configured for issuing such instructions.

Yet another aspect of the invention includes an apparatus for use in interfacing at least one Batch Client/Server computer with at least one Interactive Client/Server computer. The Batch Client/Server computer is programmed for running at least one job with an automation design program for designing a circuit. The computer is further programmed for interfacing with an Interactive Client/Server computer. An Interactive Client/Server computer is programmed for connecting to the Batch Client/Server computer for monitoring an automation design job being run on the Batch Client/Server computer.

Other aspects of the invention may include checking for input commands from the server computer and modifying running of automation design jobs in response thereto. Another aspect involves conducting the checking at predetermined intervals. A single Interactive Client/Server computer may connect and control from one to "n" Batch Client/Server computers, for example, connected on a network.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

BRIEF DESCRIPTION OF THE DRAWINGS

FIG. 1 is a system diagram illustrating a general environment in which an embodiment of the invention may be implemented.

FIG. 2 illustrates the continuum of EDA tools on which aspects of the invention may be implemented.

FIG. 3 is a flow chart having processes steps executable by the environment of FIG. 1 for realizing server interaction processes that are consistent with embodiments of the present invention.

DETAILED DESCRIPTION

In one respect, embodiments consistent with the invention include the ability to use one process for an Interactive Client/Server and a separate process for each Batch Client/Server. A Batch Client/Server may include a computer, multiple computers, servers, or any other kind of system arrangement in which commercially available EDA tools, such as IBM's PDSrtl tool, are run to conduct automation design of circuits. Further, the term Batch Client/Server may refer to multiple EDA applications running on a single machine, a single application running on a single machine, or any combination of applications, jobs and numbers of machines. An Interactive Client/Server may include a terminal, a computer or other type device, connected through a network to Batch Client/Server(s) through which a user can initiate design runs and control EDA automation design tools on Batch Client/Server(s).

In an embodiment of the invention, the Interactive Client/Server monitors user input through a web browser loaded thereon. Each Batch Client/Server continues to run normally, typically in a batch process. If the Interactive Client/Server identifies user input, that information is sent to each Batch Client/Server via a network interface. Such an interface is implemented in a conventional manner through the use of an existing application programming interface (API) for EDA tools. In an exemplary manner, at predefined intervals each Batch Client/Server checks to see if there is any user input. If there is no user input the Batch Client/Server continues normally. If there is user input, the Batch Client/Server takes appropriate action with the batch process being run in accordance with commands issued by the user through the Interactive Client/Server.

FIG. 1 shows an exemplary system 11 within which embodiments consistent with the invention may be implemented. A network 13 includes an Interactive Client/Server machine 15, such as a personal computer or other type of terminal, connected to the network 13. The machine 15 may be configured to access local databases or programs in storage 17. The network 13 may have multiple machines 15 connected thereto for conducting operations with Batch Client/Server machines 17, which may be a server computer connected to appropriate databases 21. The databases 21 may store EDA tools such as automation design programs that are run by the machines 19. The databases 21 may also store other data relating to computer design of electronic circuits.

As illustrated in FIG. 2, the invention may be implemented across the entire continuum of an EDA design, including at one end, batch processes, and at the other end, interactive processes that require continual user input. In accordance with an exemplary embodiment of the invention, a server interface provides for use across the entire continuum for control of EDA design programs being run on clients.

FIG. 3 is a flow chart 31 illustrating one exemplary embodiment of the invention. Interactions may occur at the Interactive Client/Server side 35 and at a Batch Client/Server side 33. An update at step 45 on the right side at the side 33 may include, but is not limited to, halting the job, reloading user controls, or reverting to a specific step. A batch EDA automation design job may be run on the side 33.

The side 33 may periodically check for user input 43 by accessing shared data 41. If there is no user input, then the side 33 process continues to the next step 47 and periodically returns to step 43 to check for further user input. If user input is retrieved from shared data 41, the data is checked 42 and appropriate updates 45 and changes to the batch process are made in accordance with the instructions.

On the side 35, the process may also be implemented in a recurring predetermined timing pattern where a check is periodically made for user input 37. If there is user input, a cache 39 is updated and data is passed to shared data 41. If there is no user input the process recycles back to step 37 to periodically check for user input.

Referring again to the update box 45, reverting to a specific step in the EDA process requires that cached design data or checkpoint data be read from a disk. The execution of the next step 47 will then change. Reverting to a prior step can be implemented using an array of functions. The side 33 could modify which function it plans to execute next. More specifically, the process may begin with step 1 as defined by: step 1, step 2, step 3, step n, etc. Before continuing to step 2, the client 33 may check for user input. If no user input is found, the process continues to step 2. However, the user at the side 35 may have asked the process to revert to step 1. In this case, an array index pointer is updated accordingly.

The web browser interface at the side 35 in one exemplary form is a web page capable of accepting user input. This may be implemented using preexisting form and text field widgets. Existing EDA tools may operate as a web server. Security is handled in the existing EDA web server implementation. The process may accept user input and communication with each process using the existing network API.

In conducting the method, a plurality of automation design programs running on corresponding Batch Client/Servers may be monitored. Alternatively, a plurality of Batch Client/Servers may be running on one machine. In still another alternative, the Batch Client/Servers are running a plurality of design programs on a corresponding plurality of machines.

Embodiments consistent with the invention also include a program product with a first program configured to run on at least one Batch Client/Server computer and to interface the Batch Client/Server computer with a second Interactive Client/Server interface program running on an Interactive Client/Server computer. Collectively, the program code may operate as previously described. Where so desired, the program code may be configured for periodically checking for and issuing instructions.

In an alternative embodiment, an apparatus is used for interfacing one or more Batch Client/Servers with one or more Interactive Client/Servers, for example, in an exemplary embodiment as illustrated in FIG. 1. The respective machines may be programmed to operate as previously discussed.

In addition to the foregoing description, the system may be employed to generate a graphical image for the current state of the design and displayed at a machine. In an embodiment where a tool like IBM's PDSrtl tool is run on a supported platform such as AIX, Linux, etc., the browser could involve a tool, such as Chipbench, using the same rules from the ongoing design run. This may allow a user to interactively interrogate an application while it is still running.

In general, the routines executed to implement the illustrated embodiments of the invention, whether implemented as part of an operating system or a specific application, program, object, module or sequence of instructions, may be referred to herein as computer programs, algorithms, or program code. The computer programs typically comprise instructions that, when read and executed by one or more processors in the devices or systems in computer system, cause those devices or systems to perform the steps necessary to execute steps or elements embodying the various aspects of the invention.

Moreover, while embodiments of the invention have been described in the context of fully functioning computer systems, those skilled in the art will appreciate that the various embodiments of the invention are capable of being distributed as a program product in a variety of tangible forms. The invention applies equally regardless of the particular type of computer readable signal bearing media used to actually carry out the distribution. Examples of signal bearing media comprise, but are not limited to recordable type media and transmission type media. Examples of recordable type media include volatile and nonvolatile memory devices, floppy and other removable disks, hard disk drives, magnetic tape, and optical disks (CD-ROMs, DVDs, etc.). Examples of transmission type media include digital and analog communication links.

While the present invention has been illustrated by a description of various embodiments and while these embodiments have been described in considerable detail, it is not the intention of the Applicant to restrict, or any way limit the scope of the appended claims to such detail. The invention in its broader aspects is therefore not limited to the specific details, representative apparatus, program products and method, and illustrative example shown and described. Accordingly, departures may be made from such details without departing from the spirit or scope of Applicant's general inventive concept.

What is claimed is:

1. A method of controlling an electronic design automation program that generates a model for an electronic circuit design, the method comprising:
    providing an interface at an Interactive Client/Server connected to a Batch Client/Server running at least one automation design program, wherein both of the Client/Server and the Batch Client/Server are configured to access shared data;
    checking for an input command at both the Batch Client/Server and at the Interactive Client/Server;
    retrieving the input command from the shared data at the Batch Client/Server; and
    modifying the running of at least one automation design program using the shared data during a batch process executed by the Batch Client/Server, wherein the modifying includes halting the at least one automation design program and using an array index pointer to revert to a specific point of execution of the at least one automation design program, wherein the specific point of execution is included in the input command to modify the running of at least one automation design job to generate a model for an electronic circuit design.

2. The method of claim 1, wherein said checking for the input command is conducted at predetermined intervals.

3. The method of claim 1, wherein said Interactive Client/Server is connected to a plurality of Batch Client/Servers, and said method comprises monitoring the running of respective automation design program on corresponding Batch Client/Servers.

4. The method of claim 3, wherein said plurality of Batch Client/Servers are each running a plurality of automation design programs.

5. The method of claim 3, wherein each Batch Client/Server is running a single automation design program.

6. The method of claim 1, wherein the interface is used to specify an instruction for a Batch Client/Server to execute.

7. The method of claim 1, further comprising issuing an instruction from said Interactive Client/Server to said Batch Client/Server to cancel a job and issue a report.

8. The method of claim 1, further comprising providing via the Client/Server an input command to the shared data.

9. The method of claim 1, further comprising caching the input command in a data cache prior to providing the input command to the shared data.

10. The method of claim 1, further comprising monitoring the at least one automation design program at the Client/Server.

11. The method of claim 1, further comprising periodically monitoring the at least one automation design program at the Client/Server.

12. The method of claim 1, further comprising updating a data cache in response to receiving user input at the Client/Server.

13. A program product stored on a non-transitory computer readable storage medium, which when executed by a computer, performs a method, comprising:
    executing program codes on at least one of a Batch Client/Server and an Interactive Client/Server, wherein both of the Client/Server and the Batch Client/Server are configured to access shared data, to check for an input command at the at least one Batch Client/Server and the Interactive Client/Server, to retrieve the input command from the shared data, and to allow a user at said Interactive Client/Server to modify at least one automation design program running on said at least one Batch Client/Server using the shared data, wherein the modifying includes halting the at least one automation design program and using an array index pointer to revert to a specific point of execution of the at least one automation design program, wherein the specific point of execution is included in the input command to modify the running of at least one automation design job to generate a model for an electronic circuit design.

14. The program product of claim 13, wherein said method further comprises monitoring the execution of said at least one automation design program.

15. The program product of claim 13, wherein said method further comprises allowing a user at the Interactive Client/Server to monitor the running of a plurality of automation design programs.

16. An apparatus for use in interfacing at least one Batch Client/Server computer with at least one Interactive Client/Server computer, comprising:
    at least one Batch Client/Server computer configured to run at least one job on an automation design program for designing a circuit, said Batch Client/Server computer being further configured to interface with at least one Interactive Client/Server computer and to access shared data, wherein the Batch Client/Server is configured to check for an input command; and
    at least one Interactive Client/Server computer configured to access the shared data and to check for the input command, wherein the Client/Server computer is configured to connect to at least one Batch Client/Server computer for modifying at least one automation design job being run as a batch process on said at least one Batch Client/Server computer using the shared data, wherein the modifying includes halting the at least one automation design program, and using an array index pointer to revert to a specific point of execution of the at least one automation design program, wherein the specific point of execution is included in the input command to modify the running of at least one automation design job to generate a model for an electronic circuit design.

17. The apparatus of claim 16, wherein said at least one Batch Client/Server computer is configured to check for the input command at predetermined intervals.

18. The apparatus of claim 16, wherein said at least one Batch Client/Server computer comprises a plurality of Batch Client/Server computers connected on a network, wherein said at least one Interactive Client/Server computer is connected to said network.

19. The apparatus of claim 16, wherein said at least one Interactive Client/Server computer comprises a plurality of computers connected on a network, wherein said at least one Batch Client/Server computer is connected to said network.

20. The apparatus of claim 16, wherein said at least one Batch Client/Server computer comprises a plurality of computers connected on a network, wherein said at least one Interactive Client/Server computer comprises a plurality of computers connected on said network.

* * * * *